United States Patent [19]

Larson et al.

[11] 4,169,274
[45] Sep. 25, 1979

[54] IMPLOSION RESISTANT CATHODE RAY TUBE

[75] Inventors: J. Frederick Larson, Seneca Falls; Harry R. Swank, Waterloo, both of N.Y.

[73] Assignee: GTE Sylvania Incorporated, Stamford, Conn.

[21] Appl. No.: 890,079

[22] Filed: Mar. 27, 1978

[51] Int. Cl.$^2$ .............................................. H04N 5/65
[52] U.S. Cl. ................................ 358/246; 220/2.1 A
[58] Field of Search ..................... 358/246; 220/2.1 A

[56] References Cited

U.S. PATENT DOCUMENTS

| | | | |
|---|---|---|---|
| 3,162,933 | 12/1964 | Trax | 29/25.11 |
| 3,220,593 | 11/1965 | Powell | 220/2.1 A |
| 3,350,154 | 10/1967 | Minneman | 316/19 |
| 3,508,310 | 4/1970 | Eisses | 29/25.13 |
| 3,569,990 | 3/1971 | Inglis | 358/246 |
| 3,845,530 | 11/1974 | Platt | 358/246 |

*Primary Examiner*—Howard W. Britton
*Attorney, Agent, or Firm*—Thomas H. Buffton

[57] ABSTRACT

A cathode ray tube envelope resistant to implosion includes a funnel member having a flared portion sealed to a skirt portion joined to a viewing portion of a face plate member having a mould line rearward of the skirt and viewing portion jointure. A pair of "U" shaped flat rimbands having a re-enforcing ridge encircle the skirt portion with a forward edge intermediate the mould line and jointure of the skirt and window portions. A tension strap is applied intermediate the forward edge and re-enforcing ridge of the rimbands.

The implosion-resistant envelope is fabricated by sealing the flared portion of the funnel member to the skirt portion of the face plate member encircling the skirt portion with the "U" shaped rimbands with the forward edge of the rimbands intermediate the jointure of the window and skirt portions and the mould line and compressing the rimbands with a strap member disposed intermediate the forward edge and re-enforcing ridge of the rimbands.

8 Claims, 2 Drawing Figures

IMPLOSION RESISTANT CATHODE RAY TUBE

CROSS REFERENCE TO OTHER APPLICATIONS

A concurrently filed application, bearing U.S. Ser. No. 890,080 entitled Implosion-Resistant Cathode Ray Tube and Fabricating Process filed in the names of O. Wendell Amstutz, William A. Dickinson, and James F. Kreidler relates to an implosion-resistant cathode ray tube having an envelope with funnel and face plate members, flat rimbands having adhesive on the inner surface and a bracket member affixed thereto, and a strap member compressing the rimbands about the skirt portion of the face panel member rearward of the skirt and viewing portion jointure of the face plate member.

BACKGROUND OF THE INVENTION

This invention relates to implosion resistant cathode ray tube envelopes and more particularly to a cathode ray tube envelope having a sealed face plate member and funnel member with a U-shaped pair of flat rimbands compressed against the face plate member by a tensioned strap member.

The prior art suggests numerous techniques for enhancing the resistance to fracture of a cathode ray tube envelope. One technique provides a one-piece rim member which is placed in surrounding relationship to the skirt portion of a face plate sealed to a funnel of a cathode ray tube envelope. A foam or resin tape is either intermediate the rim member and skirt portion or the space therebetween is filled with a back-filling resin whereupon heat is applied to effect a tensioned fit of the rim band about the face plate.

Another known technique for fabricating implosion resistant cathode ray tube envelopes is the so-called method of controlled devacuation. Therein, a pair of rimbands are shaped to the contour of a face plate member and compressed by a surrounding tension band. Normally, the rimbands extend over and cover a portion of the front edge of the face plate of the cathode ray tube.

Although the above-mentioned techniques have been and still are employed in numerous fabricated cathode ray tube envelopes, it has been found that the known rimband structures leave something to be desired. More specifically, it has been found that rimbands contoured to the face of the plate are relatively expensive, as compared with a flat ribbon-like material, and require more sophisticated and expensive handling apparatus. Moreover, the contours of the rimband are not particularly suitable for the numerous different size envelopes and have a tendency to undesirably distort upon application of a compressive force thereto.

OBJECTS AND SUMMARY OF THE INVENTION

An object of the present ivention is to overcome or at least reduce the above-mentioned disadvantages of the prior art. Another object of the invention is to provide an enhanced implosion resistant cathode ray tube. Still another object of the invention is to improve the implosion resistant capabilities of a cathode ray tube. A further object of the invention is to provide an implosion resistant cathode ray tube utilizing inexpensive and easily handled materials. A still further object of the invention is to provide an improved process for fabricating an enhanced implosion resistant cathode ray tube.

These and other objects, advantages and capabilities are achieved in one aspect of the invention by a cathode ray tube envelope having a funnel with a neck portion having electron guns sealed therein and a flared portion sealed to the skirt portion of a face plate member having an adjoining window portion. The face plate member has a mould line rearward of the jointure of the skirt and window portion. A pair of U-shaped flat rimbands have a leading edge disposed intermediate the jointure of the window and skirt portions of the face plate and the mould line. The rimbands have a re-enforcing ridge rearward of the leading edge and a strap member is tensioned intermediate the leading edge and re-enforcing ridge.

Also, an implosion resistant cathode ray tube, such as described above, is fabricated by a process wherein a pair of U-shaped flat rimbands have a leading edge portion encircling the skirt portion of the face plate member with the leading edge portion intermediate the jointure of the skirt and window portions and the mould line. The pair of U-shaped flat rimbands have a re-enforcing ridge rearward of the leading edge and a strap member is disposed intermediate the leading edge and re-enforcing ridge and tensions rimband members.

DESCRIPTION OF THE PREFERRED EMBODIMENT

For a better understanding of the present invention, together with other and further objects, advantages and capabilities thereof, reference is made to the following disclosure and appended claims in conjunction with the accompanying drawings.

Figure 1:
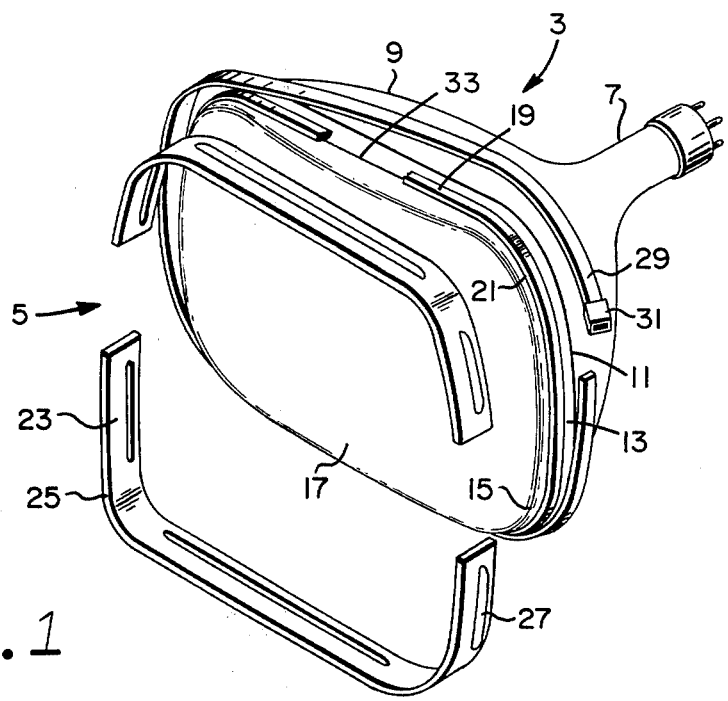
FIG. 1 is a perspective view of a cathode ray tube illustrating a preferred embodiment of the invention.

Referring to FIG. 1 of the drawings, a cathode ray tube includes a funnel member 3 and a face plate member 5. The funnel member 3 includes a neck portion 7 having a plurality of electron guns (not shown) sealed therein and leads to a flared portion 9. The flared portion 9 is sealed at a seal line 11 to the skirt portion 13 of the face plate member 5. Moreover, the skirt portion 13 is joined at a jointure 15 to a viewing portion 17.

A tape member 19 encircles the skirt portion 13 and has a leading edge 21 which is disposed rearwardly of the jointure 15 of the skirt and viewing portions 13 and 17 of the face plate member 5. A pair of substantially U-shaped flat rimbands 23 encircle the tape member 19 and skirt portion 13 of the face plate member 5. The flat rim bands 23 have a leading edge 25 which is substantially aligned with the leading edge 21 of the tape member 19.

Also, the U-shaped flat rimbands 23 have re-enforcing ridges 27 which are rearward of the leading edge 25 and extend intermediate the corners of the U-shaped rimbands 23. A strap member 29 is positionally located on the rimbands 23 intermediate the leading edge 25 and the re-enforcing ridges 27. This strap member 29 has a tensional force exerted thereon and this tensional force is maintained by a crimped member 31 affixed thereto. Thus, the strap member 29 and rimbands 23 exert a compressional force on the tape member 19 and skirt portion 13 of the face plate member 5.

Figure 2:
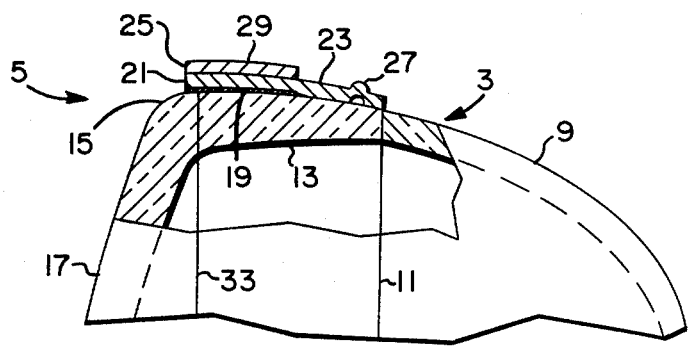
FIG. 2 is an enlarged fragmentary view taken along the lines 2—2 of FIG. 1.

As can be more clearly seen in the fragmentary view of FIG. 2, the skirt portion 13 and the viewing portion 17 of the face plate member 5 form a jointure 15 therebetween. This jointure 15 is forward of a mould line 33 which is, in turn, forward of the seal line 11 of the skirt portion 13 of the face plate member 5 and the flared portion 9 of the funnel member 3.

A tape member encircles the skirt portion 13 of the face plate member 5 and has a leading edge 21 which is preferably disposed intermediate the jointure 15 of the viewing and skirt portions and the mould line 33 of the face plate member 5. Preferably, the tape member 19 is a clear acrylic such as Permacel J-lar 910 manufactured by the Permacel Corporation of New Bruneswick, N.J. However, other forms of available tape members are also appropriate to the structure such as fiber-reinforced tapes for example. Moreover, the tape member 19 is preferred but not necessary, so long as increased residual tension is provided.

Overlying the tape member 19 is a pair of substantially U-shaped flat rimbands 23 having a width in the range of about 1–3 inches and a thickness in the range of about 0.018–0.030 inch. The rimbands 23 are oppositely disposed with respect to one another and encircle the skirt portion 13 of the face plate member 5 and the tape member 19 affixed thereto. Also, the rimbands 23 have a leading edge 25 which is disposed intermediate the jointure 15 of the skirt and viewing portion and the mould line 33 and preferably in alignment with the leading edge 21 of the tape member 19.

Further, the substantially U-shaped flat rimbands 23 have a re-enforcing ridge 27 with a radius in the range of about ⅛–1/32 inch and preferably about 3/64 inch. This re-enforcing ridge 27 is located intermediate the corners and ends of each of the rimbands 23 and extends outwardly with respect to the skirt portion 13 of the face plate member 5.

A tension strap 29 encircles the rimbands 23 and is disposed intermediate the leading edge 25 and re-enforcing ridge 27 of the rimbands 23. Preferably, the tension strap 29 is a cold-rolled steel material having a width of about ¾ inch and a thickness of about 0.025 inch. Moreover, the tension strap 29 is adjusted to provide a tensional force which is at least ten percent (10%) greater than required on presently known rimbands to meet standard safety tests which will be further explained hereinafter.

More specifically, it has been found that it is possible to improve the implosion cathode ray tube capabilities by maintaining or increasing the compressive force exerted on the cathode ray tube structure. Thus, a reduction in area under compression accompanied by an increase in the residual tensional force exerted on the reduced area not only reduces the cost of the structure but, more importantly enhances the implosion capabilities of the structure.

For example, it has been found that prior structures, such as a 19-inch diagonally measured cathode ray tube, would normally have rimbands of the so-called "eyebrow" type which curl around the window portion of the face plate member 5 and help locate the rimbands. Moreover, such structures normally have a strap member 29 with a residual tensional force of about 900-pounds.

However, reducing the so-called "eyebrow" type structures to the presently formed U-shaped flat rimbands 23 and increasing the residual tensional force on the strap member 29 by about ten percent (10%) has been found to provide structures which have met all known safety requirements. As mentioned, increased residual tensional force exerted on a reduced area appears to enhance the implosion capabilities of the structure.

In a process for fabricating the above-described structure, the tape member 19 is affixed to the face plate intermediate the jointure 15 of the skirt and viewing portions and the mould line 33 of the face plate member 5. The U-shaped flat rimbands 23 are oppositely disposed to encircle the tape member 19 with the forward edge 25 of the rimbands intermediate the jointure 15 of the skirt and viewing portions and the mould line 33 of the face plate member 5. Moreover, the re-enforcing ridge 27 is rearward of the leading edge 25.

Thereafter, a strap member 29 is wrapped about the rim member 23 intermediate the forward edge 25 and the re-enforcing ridge 27. The strap member 29 has a tensional force thereon which is at least 10% greater than previously applied to the known structures. As previously mentioned for example, a 19-inch diagonally measured cathode ray tube with "eyebrow" type rimbands would normally have a tensional force exerted thereon of about 900-pounds. Thus, the present structure would utilize at least a 10% greater residual tension force.

A series of standard safety tests, described in Underwriters Laboratories Report UL-1418 and Canadian Standards Association report CSA 22.2 include a 5 ft.-lb ball impact test and a 15 ft.-lb missile test wherein the face plate of the cathode ray tube are impacted, were conducted on the above-described structures. In each case, the above-described structures provided improved results over prior marketable structures and meet the above-mentioned Underwriters Laboratories and Canadian Standards Association requirements for safety.

Thus, there has been provided a cathode ray tube envelope having improved resistance to fracture and implosion effects. The apparatus is inexpensive of labor and materials as compared with prior known structures and provides an implosion resistant capability unavailable with any known similar structure. Also the structure is readily fabricated with a minimum of apparatus and equipment as well as with a comparatively inexpensive cost in labor.

While there has been shown and described what is at present considered the preferred embodiments of the invention, it will be obvious to those skilled in the art that various changes and modifications may be made therein without departing from the invention as defined by the appended claims.

What is claimed is:

1. A cathode ray tube envelope resistant to fracture and implosion effects upon breakage comprising:
   a funnel member having a neck portion with a plurality of electron guns sealed therein and tapering to a flared portion;
   a face plate member having a viewing portion joined to a rearwardly extending skirt portion with said skirt portion sealed to said flared portion of said funnel member at a seal line and a mould line disposed rearwardly of said viewing and skirt portion jointure;
   a pair of substantially U-shaped flat rimbands located on and encircling said skirt portion of said face plate member with each rimband having a re-enforcing ridge extending outwardly from said skirt portion, said rimbands having a forward edge intermediate said jointure of said viewing and skirt portions and said mould line said face plate member; and a tension strap encircling and tensioning said pair of U-shaped flat rimbands against said skirt portion of said face plate member, said tension strap located intermediate said jointure of said viewing and skirt portions and said re-enforcing ridge and having a forward edge intermediate said jointure of said viewing and skirt portions and said mould line of said face plate member.

2. The cathode ray tube envelope of claim 1 including a tape member positioned intermediate said rimbands and said skirt portion of said face plate member and having a forward edge intermediate said jointure of said window and skirt portions and said mould line of said face plate member.

3. The cathode ray tube envelope of claim 1 wherein said tension strap is a cold-rolled steel strap having a ¾ inch width and a thickness of about 0.025 inch with a residual tensional force in an amount sufficient to satisfy standard safety tests.

4. The cathode ray tube envelope of claim 1 wherein said rimbands are of cold-rolled steel having a width in the range of 1–3 inches and a thickness in the range of 0.018–0.30-inch.

5. The cathode ray tube envelope of claim 1 wherein said face plate member and said rimbands are substantially rectangular-shaped with corners and said re-enforcing ridge of said rimbands extend intermediate to said corners.

6. The cathode ray tube envelope of claim 1 wherein said re-enforcing ridge of said rimbands has a radius in the range of about ⅛ to 1/32-inch.

7. The cathode ray tube envelope of claim 2 wherein said tape member is a clear acrylic material.

8. The cathode ray tube envelope of claim 2 wherein said tape member is a fiber-reinforced material.

* * * * *